United States Patent
Miramontes (10) Patent No.: US 8,909,676 B1
(45) Date of Patent: Dec. 9, 2014

(54) STAR CLUSTER CODESET DATABASE FOR UNIVERSAL REMOTE CONTROL DEVICES

(75) Inventor: Oscar C. Miramontes, El Paso, TX (US)

(73) Assignee: UEI Cayman Inc., Santa Ana, CA (US)

( * ) Notice: Subject to any disclaimer, the term of this patent is extended or adjusted under 35 U.S.C. 154(b) by 2560 days.

(21) Appl. No.: 11/544,147

(22) Filed: Oct. 6, 2006

(51) Int. Cl.
*G06F 7/00* (2006.01)
*G06F 17/30* (2006.01)

(52) U.S. Cl.
USPC .............................. 707/795; 707/803; 341/23

(58) Field of Classification Search
None
See application file for complete search history.

(56) References Cited

U.S. PATENT DOCUMENTS

| | | | | |
|---|---|---|---|---|
| 5,029,508 A * | 7/1991 | Suzuki et al. | ................... | 84/616 |
| 5,214,785 A * | 5/1993 | Fairweather | .................... | 710/67 |
| 5,396,267 A * | 3/1995 | Bouton | ......................... | 345/168 |
| 5,515,052 A | 5/1996 | Darbee | | |
| 5,551,701 A * | 9/1996 | Bouton et al. | .................. | 463/36 |
| 5,610,631 A * | 3/1997 | Bouton et al. | ................. | 345/161 |
| 6,071,194 A * | 6/2000 | Sanderson et al. | ............... | 463/37 |
| 7,227,492 B1 * | 6/2007 | Provis et al. | ................... | 341/176 |
| 7,317,865 B2 * | 1/2008 | Fecht et al. | .................... | 386/281 |
| 7,448,071 B2 * | 11/2008 | Bender et al. | ...................... | 726/4 |
| 7,548,246 B2 | 6/2009 | Huang et al. | | |
| 7,746,244 B2 | 6/2010 | Wouters | | |
| 2002/0184526 A1 * | 12/2002 | Bender et al. | ................. | 713/201 |
| 2004/0041943 A1 * | 3/2004 | Fecht et al. | ................... | 348/441 |
| 2007/0063860 A1 | 3/2007 | Escobosa et al. | | |

* cited by examiner

*Primary Examiner* — Daniel Kuddus
(74) *Attorney, Agent, or Firm* — Geenberg Traurig, LLP (57) ABSTRACT

A codeset database for a universal remote control device includes a device index table, a key index table, protocol tables, and a set of keycode data structures. A keycode data structure includes a plurality of keycode data structure pointers (KDSPs) and one or more optional keycodes. In a star linking method, a keycode data structure is linked to multiple keycode data structures by pointing to those keycode data structures using multiple KDSPs. In a cluster linking method, a keycode data structure is linked to multiple keycode data structures by being pointed by those keycode data structures. A keycode data structure may not contain any actual keycodes, but a plurality of keycode data structure pointers and other information. A special value inside the keycode data structure is used to indicate whether and how keycode data structures are linked together.

12 Claims, 11 Drawing Sheets

| COORDINATE OF KEY PRESSED | | OFFSET TO ITS FLAG BIT IN THE FLAG BYTE |
|---|---|---|
| ROW | COL | OFFSET |
|  |  |  |
|  |  |  |
|  |  |  |
|  |  |  |
|  |  |  |
|  |  |  |

KEY INDEX TABLE

FIG. 5

| DEVICE TYPE | DEVICE CODE | ADDRESS OF KEYCODE TABLE |
|---|---|---|
| TV |  |  |
| DVD |  |  |
| CABLE |  |  |
| VCR |  |  |

DEVICE INDEX TABLE

FIG. 6

KEYCODE DATA STRUCTURE

FIG. 7

MARK/SPACE TABLE

STAR CLUSTER CODESET DATABASE FOR UNIVERSAL REMOTE CONTROL DEVICES

TECHNICAL FIELD

The present invention relates to a database of data structures for storing compressed keycode information for generating IR operational signals, such as those transmitted from an IR remote control device.

BACKGROUND

A Universal Infrared Remote (UIR) is a remote control device that sends out operational signals to control one or more types of electronic consumer devices such as TVs, VCRs, Cable set-top boxes, and CD/DVD players. Each operational signal conveys a keycode associated with the selected electronic consumer device. Each keycode corresponds to a function of the selected electronic consumer device, such as power on, power off, volume up, volume down, play, stop, select, channel up, channel down, etc. A particular brand and make of electronic consumer device responds to operational signals containing a particular set of keycodes and performs the corresponding functions.

In order to provide the functionality of a UIR, various types of keycodes are stored in keycode tables (also referred to as keycode data structures) in a codeset database format. Each type of keycode table is identified by a three digit device code corresponding to a particular brand and make of an electronic consumer device. A user first programs the UIR to control a particular device type by entering its corresponding three digit device code. Thereafter, when the user presses a key on the UIR, a processor inside the UIR uses the device code to locate the address of a corresponding keycode table. The processor then searches for the keycode of the pressed key within the keycode table. If the keycode is found, then an operational signal is generated and transmitted to control the selected electronic consumer device.

One particular keycode table is defined by a keycode data structure that includes a device type byte, a set of keycodes, system code information, a system data byte, a keycode data structure pointer (KDSP) and a protocol data structure pointer (PDSP) that points to a protocol table which stores timing, modulation, and encoding information. The keycode data structure also includes a number of flagbytes that are used to mask each particular key among the keycodes.

Figure 1:
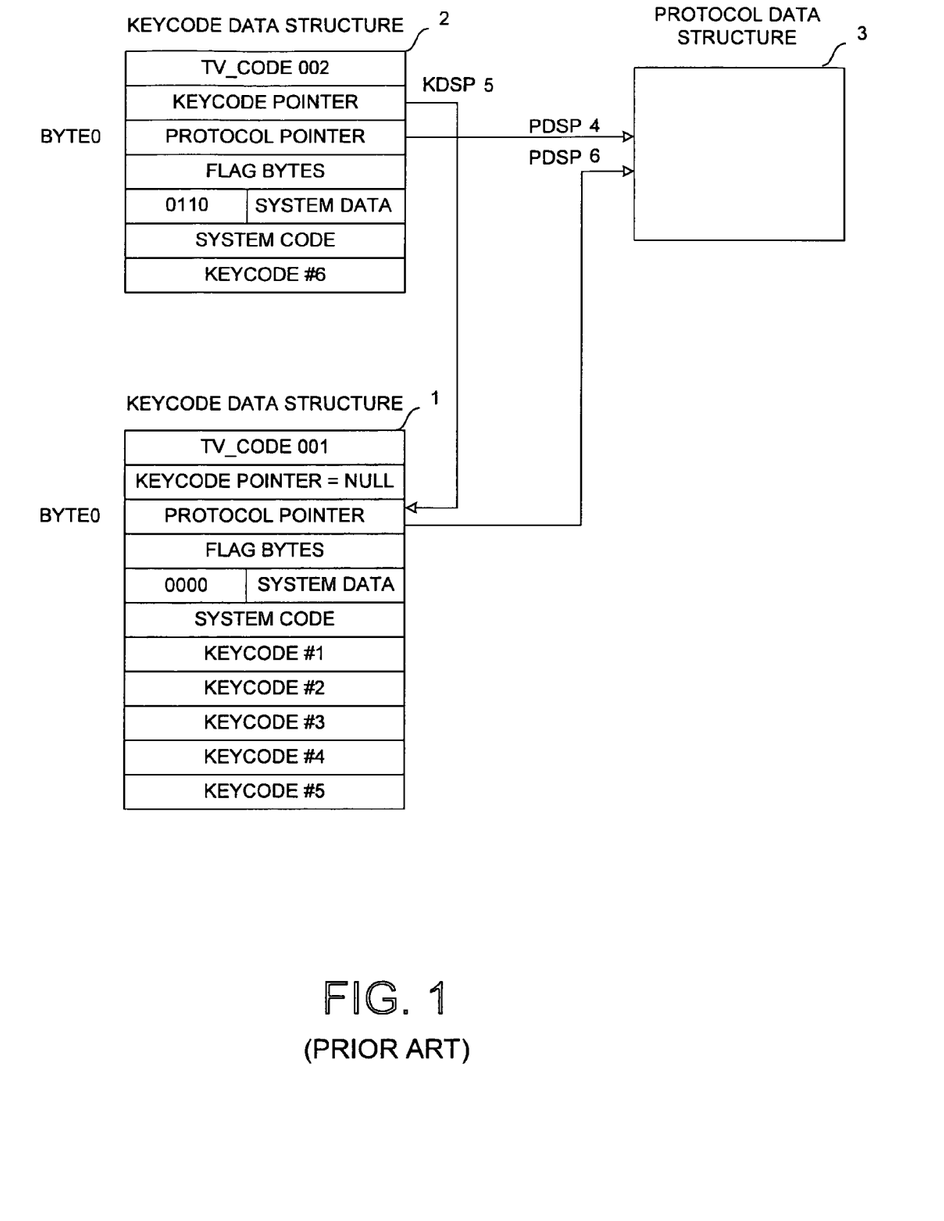
FIG. 1 (prior art) illustrates an example of a keycode database format.

FIG. 1 (prior art) illustrates one method of linking keycode data structures in order to store the codeset database efficiently. In the example of FIG. 1, keycode data structure 1 is used for TV device type 001 and keycode data structure 2 is used for TV device type 002. Keycode data structure 1 contains KEYCODES #1-#5, representing all common keys for a TV. Keycode data structure 2 contains KEYCODE #6, representing the "sleep" key. Suppose that the UIR is programmed to control TV002 and that a user presses the "sleep" key. The processor first locates the byte0 address of keycode data structure 2, it then finds KEYCODE #6 and generates an operational signal using the protocol information of protocol data structure 3 pointed by PDSP 4. Now suppose that the user presses the "power" key. The processor searches but cannot find the keycode of the "power" key in keycode data structure 2. The processor then locates the byte0 address of keycode data structure 1 pointed by KDSP 5. The processor finds the keycode (for instance, KEYCODE #2) corresponding to the "power" key and generates an operational signal using the protocol information of protocol data structure 3 pointed by PDSP 6.

By linking keycode data structures 1 and 2 using KDSP 5, this chain linking method is able to eliminate the redundant storing of keycodes #1-#5 in keycode data structure 2, thereby saving memory space. However, in this example, TV_CODE002 contains all the keycodes of TV_CODE001, in other words, is a superset of TV_CODE001. If TV_CODE001 has an additional keycode that is not included in TV_CODE002, then the chain linking scheme does not work.

Figure 2:
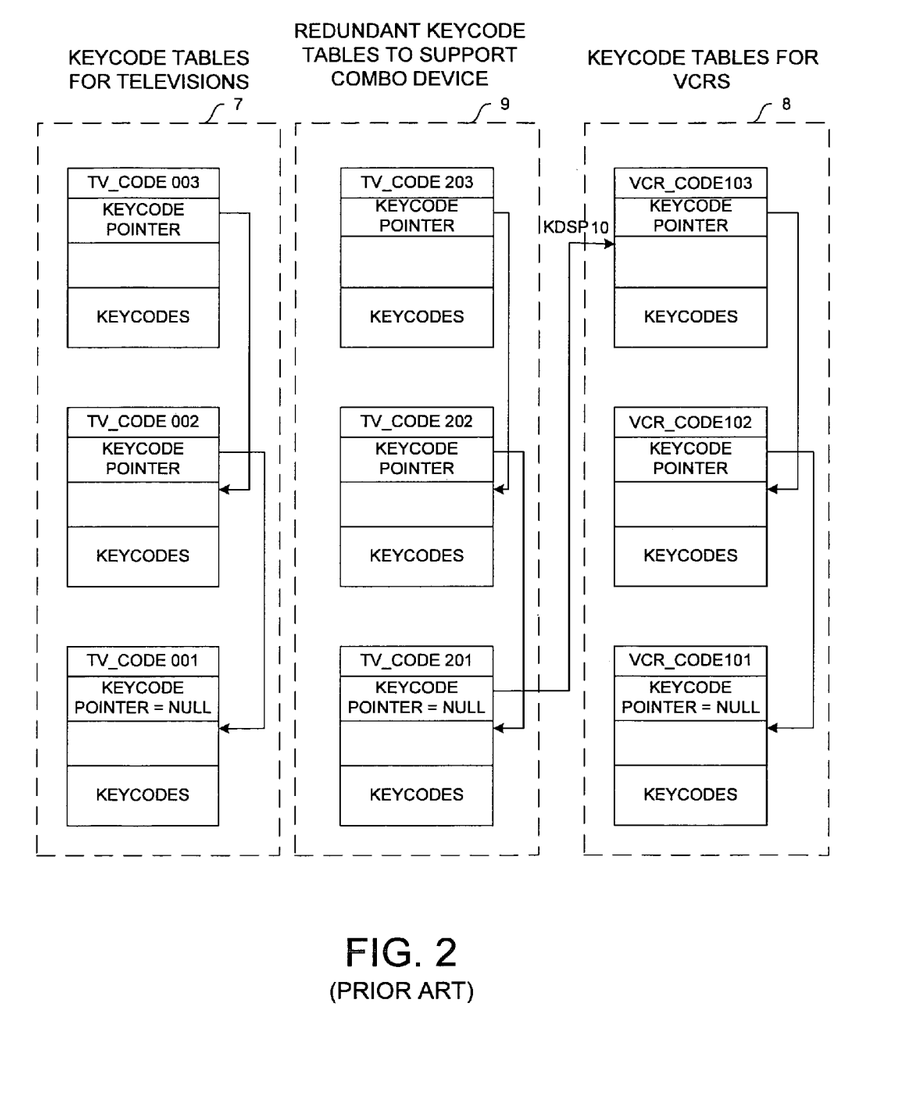
FIG. 2 (prior art) illustrates an example of a set of keycode tables for a combo device.

FIG. 2 illustrates an example of a codeset database that supports a type of electronic consumer device called a "combo device". In the example of FIG. 2, TV keycode tables 7 are linked together and VCR keycode tables 8 are linked together using the chain linking scheme. For illustration purposes, assume that the combo device is a television with a built-in VCR. Further assume that the TV portion of the combo device uses TV keycode table TV_CODE003, whereas the VCR portion uses VCR keycode table VCR_CODE103. Under the chain linking scheme, TV_CODE003 and VCR_CODE103 cannot be further linked together because such linking would destroy the database's ability to individually support the TV and the VCR. Therefore, for combo device, TV keycode tables 9 are duplicated from TV keycode tables 7 and then linked to VCR keycode tables 8 by KDSP 10. If an operational signal for a combo device is to be generated, the processor searches for the keycode of the pressed key starting in keycode table TV_CODE203. Searching then proceeds through keycode tables TV_CODE202, TV_CODE201, VCR_CODE103, VCR_CODE102, and VCR_CODE101 until the keycode is found.

Because of the large number of different electronic consumer devices, the amount of memory space needed to store the codeset database is large. Therefore, it is desirable to have an optimized compression scheme of storing a codeset database that reduces the amount of memory substantially. It is especially desirable to be able to store a codeset database for combo devices without the need to duplicate large numbers of keycode tables.

SUMMARY

A remote control device can generate an operational signal that controls an electronic consumer device of a selectable type. The operational signal contains a keycode (sometimes referred as a "command code") associated with the selected electronic consumer device. Various types of keycodes are stored as keycode data structures (sometimes referred as "groups of command codes") in a codeset database format.

One particular keycode data structure includes a device type byte, a set of keycodes, system code information, a system data byte, a protocol pointer that points to a protocol table and a number of flagbytes that are used to index a particular key among the keycodes. The keycode data structure also contains a plurality of keycode data structure pointers (KDSPs). Keycode data structures are linked together using KDSPs. A special value (for instance, 1001) in the keycode data structure is used to indicate that the keycode data structure contains multiple KDSPs. The number of pointers is stored in a particular location (for instance, byte-1) of the keycode data structure.

In one embodiment, several keycode data structures are maintained and linked together using a sequential star linking scheme for a "combo device." An example of a "combo device" is a television with a built-in VCR. A dummy keycode data structure is provided. The dummy keycode data structure does not contain any keycodes for TV or VCR. Instead, it contains two keycode data structure pointers. The first KDSP is used to point to a TV keycode data structure which contains the keycodes for one of the device types of the combo device. The second KDSP is used to point to a VCR keycode data structure which contains the keycodes for the other of the device types of the combo device.

In another embodiment, several keycode data structures are maintained and linked together as a cluster to achieve a high degree of compression. In the example of a particular TV device type 001, a common keycode data structure is provided. The common keycode data structure contains the actual TV keycodes for TV_CODE001 and some system codes. Suppose there are several other TV device types whose corresponding keycodes are the same as the keycodes for TV_CODE001. However, their corresponding system codes are different from the system codes for TV_CODE001. A new set of keycode data structures is provided for those other TV device types. Each new keycode data structure has a KDSP that points to the common keycode data structure. In addition, each new keycode data structure contains no actual keycodes, but does contain system codes. A special value (for instance, 1010) in the new keycode data structures is used to indicate that the system code in its own keycode data structure is used even if the actual keycode is found in the common keycode data structure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
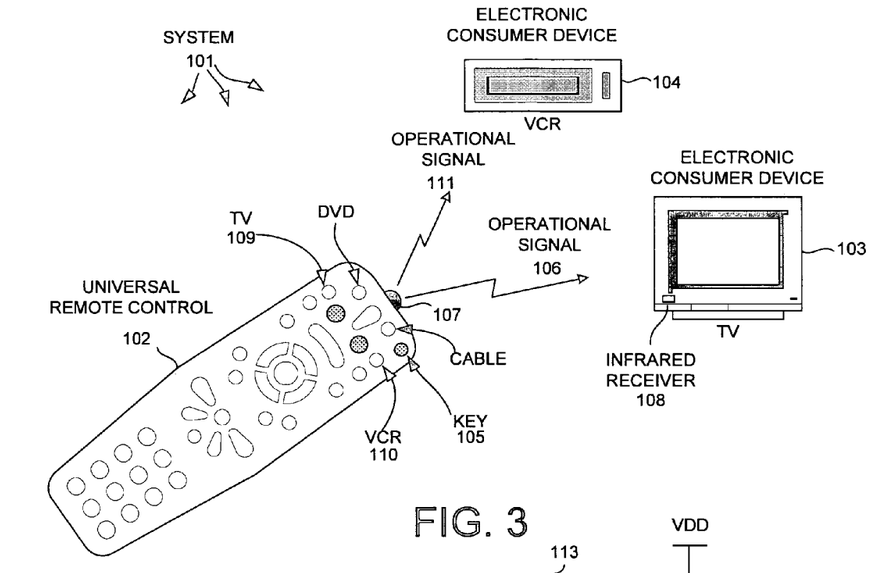
FIG. 3 illustrates a system in accordance with one novel aspect.

FIG. 3 is a diagram of a system 101 in accordance with one novel aspect. System 101 includes a remote control device 102, a first electronic consumer device 103, and a second electronic consumer device 104. A user uses remote control device 102 to control a selected electronic consumer device. In the example of FIG. 3, a user may press key 105 on the remote control device 102 to turn on/off the power of the first electronic consumer device 103, a television. When the user presses key 105, remote control device 102 emits an operational signal 106 from a LED (light emitting diode) 107. Operational signal 106 is transmitted to an infrared receiver 108 of TV 103. Infrared receiver 108 interprets operational signal 106 and takes appropriate action, which in this case is to turn on the TV if it is off, or to turn off the TV if it is on.

Remote control device 102 of FIG. 3 is a Universal Infrared Remote control device (UIR). Such UIR can be programmed to send out infrared signals to control several types of electronic consumer devices, such as TVs, VCRs, Cable set-top boxes, and CD/DVD players. For example, to program UIR 102 to control a particular brand and make of TV 103, the user first presses device key 109, and then inputs a three digit device code. Thereafter, when the user presses key 105, operational signal 106 is transmitted to control TV 103. Similarly, to program UIR 102 to control a particular brand and make of VCR 104, the user first presses the device key 110, and then inputs a three digit device code. Thereafter, when the user presses key 105, operational signal 111 is transmitted to control VCR 104.

Figure 4:
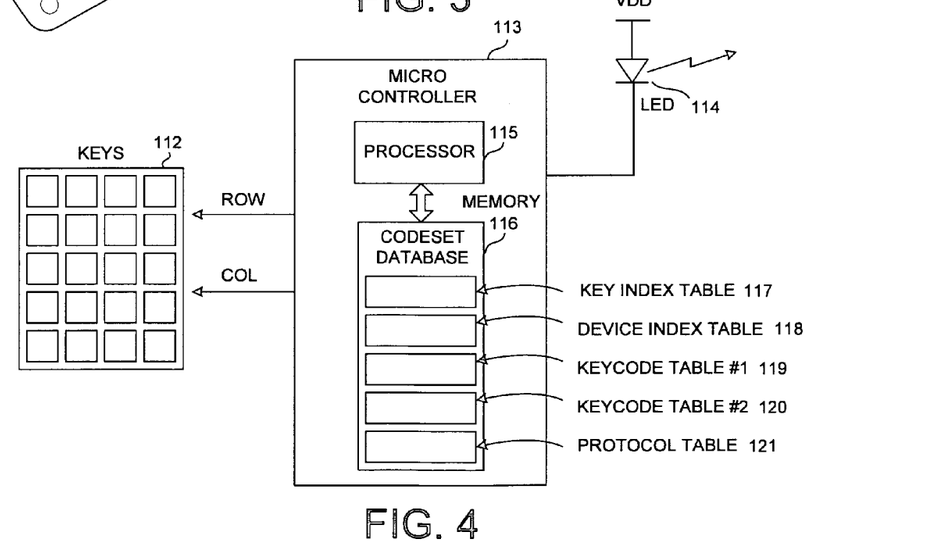
FIG. 4 is a diagram of a circuit within a remote control device.

FIG. 4 is a diagram of a circuit within remote control device 102 of FIG. 3. The circuit of FIG. 4 includes a set of keys 112, a microcontroller 113, and an infrared LED 114. Microcontroller 113 includes a processor 115 and a memory 116. Memory 116 stores software programs executable by processor 115 and a codeset database (sometimes referred as a codeset library). The codeset database includes a key index table 117, a device index table 118, a set of keycode tables (for instance, two keycode tables 119 and 120 are illustrated), and a protocol table 121. Microcontroller 113 performs key-scanning and determines the row and column coordinates of any key that is pressed by the user.

Figure 5:
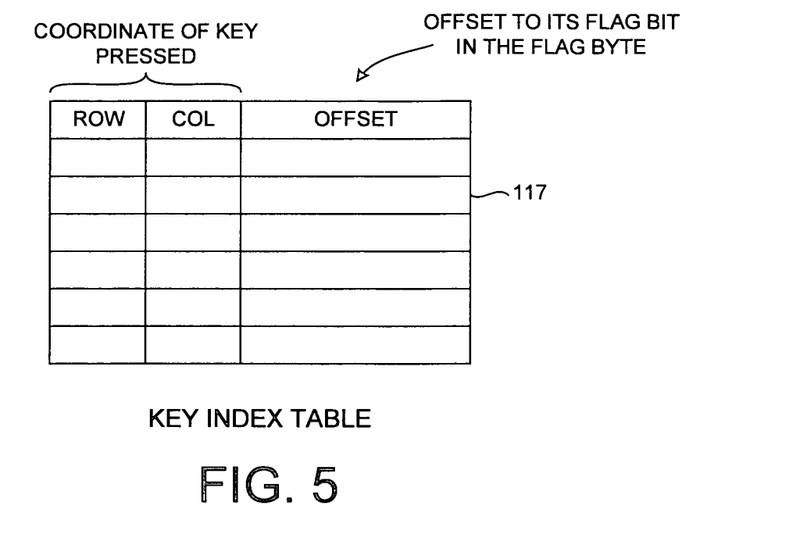
FIG. 5 illustrates the key index table of FIG. 4.

FIG. 5 is an illustration of key index table 117 of FIG. 4. For each row and column of a key coordinate, key index table 117 includes an offset value.

Figure 6:
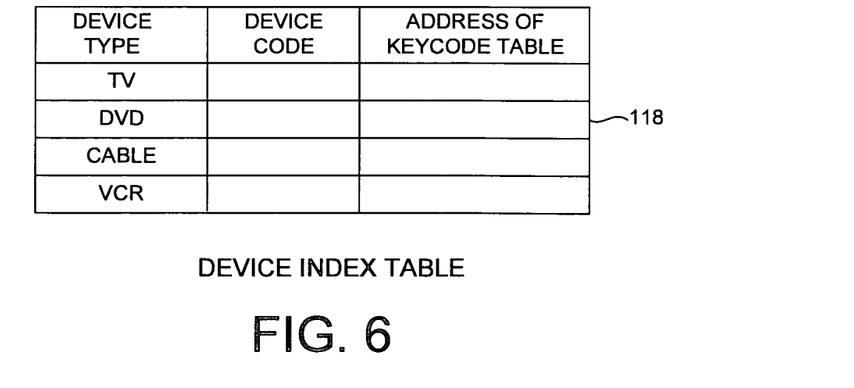
FIG. 6 illustrates the device index table of FIG. 4.

FIG. 6 is an illustration of device index table 118 of FIG. 4. For each three digit device code identifying a particular brand and make of a device type, device index table 118 includes an address of the corresponding keycode table (also referred as a keycode data structure).

Figure 7:
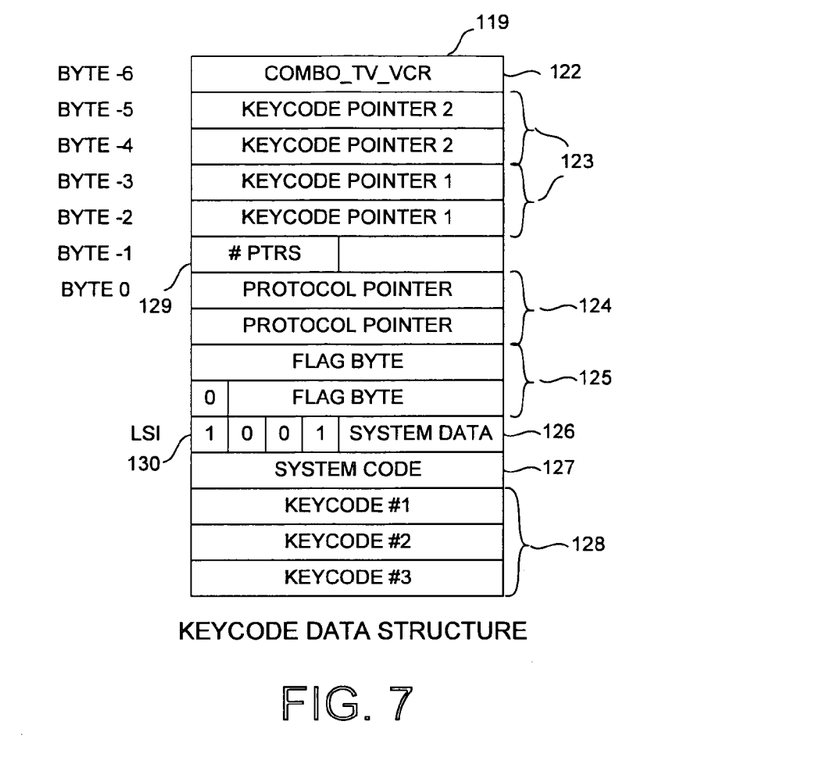
FIG. 7 illustrates an example of a keycode data structure in accordance with one novel aspect.

FIG. 7 illustrates the content of keycode data structure 119 in accordance with one novel aspect. Keycode data structure 119 is a block of continuous bytes stored in memory 116 of FIG. 4. It includes a device type byte 122, one or more keycode data structure pointers (KDSPs) 123, a protocol pointer 124, one or more flag bytes 125, a system data byte 126, a system code byte or bytes 127, and a set of keycodes 128. Each KDSP 123 is a two-byte pointer that contains the absolute address of a memory location. Alternatively, Each KDSP 123 may be a relative offset value. The offset value is the difference between the address of the current memory location and the address of the memory location that KDSP 123 points to. The number of keycode data structure pointers 129 is stored in byte −1. The last flag byte is indicated by a value 0 in its least significant bit (LSB). The lower bits of system data byte 126 are used to store the size information of system code and keycodes. The upper bits of system data byte 126 are used as a linking scheme identifier (LSI) 130, which indicates whether and how keycode data structure 119 is linked to other keycode data structures.

When a user presses a key on remote control device 102 of FIG. 3, processor 115 of FIG. 4 accesses device index table 118 of FIG. 6 to obtain the byte0 address of a keycode data structure corresponding to the three digit device code that the user has programmed. Processor 115 also accesses key index table 117 of FIG. 5 to obtain the offset value of its flag bit in the flag bytes of the keycode data structure corresponding to the key coordinates that the user has pressed. Using the offset value, processor 115 identifies the flag bit in the keycode data structure and determines whether the pressed key is present in the keycode data structure. The keycode of the pressed key is present if the flag bit is of value 1. The keycode of the pressed key is not present if the flag bit is of value 0. Assume that the keycode is found in the keycode data structure, processor 115 uses the keycode in combination with system code information 127 to generate an operational signal according to the timing and modulation scheme information of the protocol table pointed by protocol pointer 124 (sometimes the timing and modulation scheme information is included within the keycode).

Figure 8:
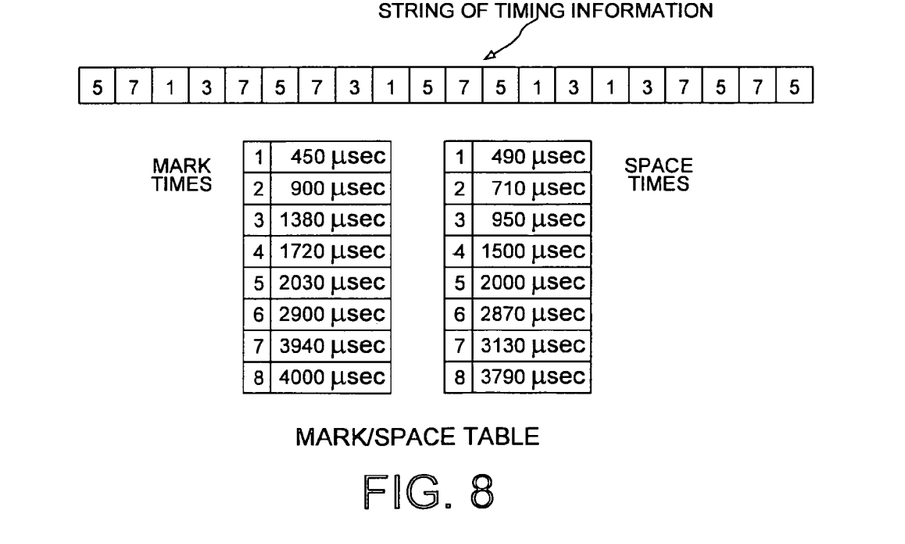
FIG. 8 illustrates a mark/space table.

The keycode data can take any one of numerous forms. FIG. 8 is a diagram of one example of what a keycode within a keycode data structure might look like. The keycode data in this case is a string of timing information containing a sequence of values, where each value is an index that points to an associated value in a mark/space table. In the example of FIG. 8, the first value 5 identifies a mark time of 2030 μsec, the next value 7 identifies a space time of 3130 μsec, the next value 1 identifies a mark time of 450 μsec, and so forth. The sequence of mark times and space times is then output by microcontroller 113 to control LED 114 to generate an operational signal.

Figure 9:
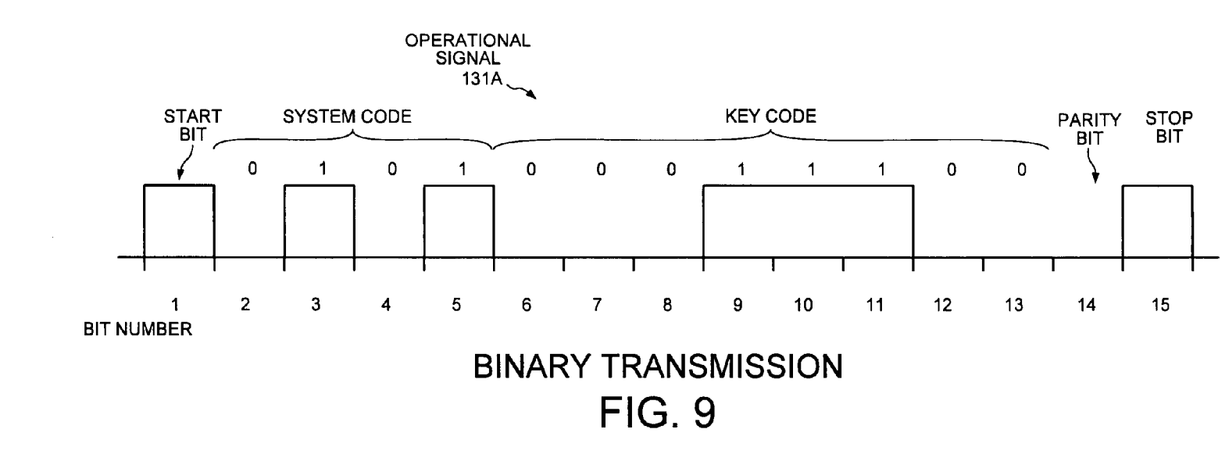
FIG. 9 illustrates an operational signal using binary transmission.

FIG. 9 is another example of what a keycode within a keycode data structure might look like. In the example of FIG. 9, the keycode data is a sequence of bits 00011100 and is transmitted in operational signal 131A as a stream of digital values in binary transmission format.

Figure 10:
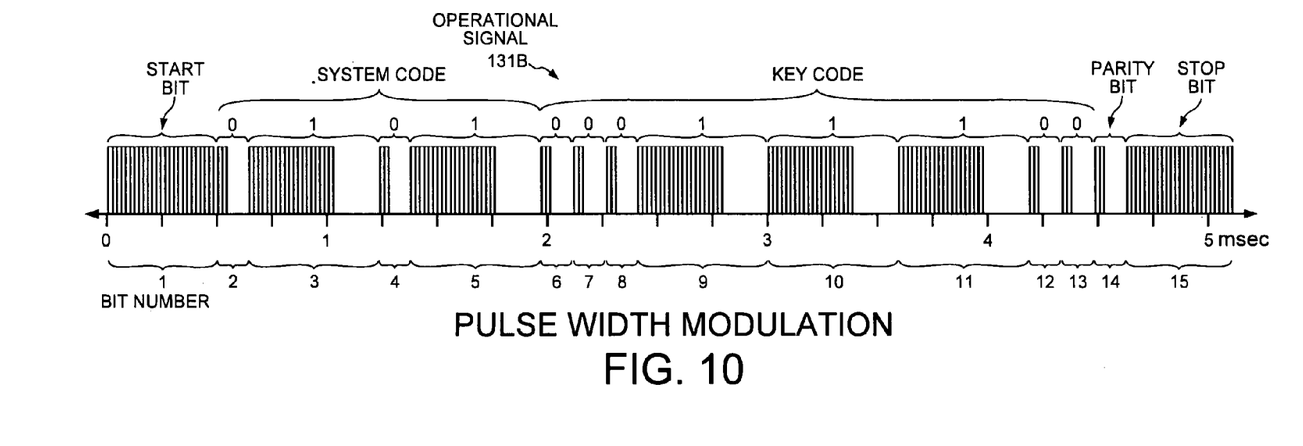
FIG. 10 illustrates an operational signal using pulse width modulation.

FIG. 10 is an illustration of another representative operational signal 131B. In the example of FIG. 10, the keycode is modulated onto operational signal 131B using pulse width modulation. Digital ones and zeros are characterized by pairs of marks and spaces. A digital zero has a shorter duration of mark time than a digital one. Regardless of the form of the keycode (as illustrated in FIG. 8 or FIG. 9), the same operational signal that can be understood by an electronic consumer device is transmitted by remote control device 102 of FIG. 3.

Figure 11:
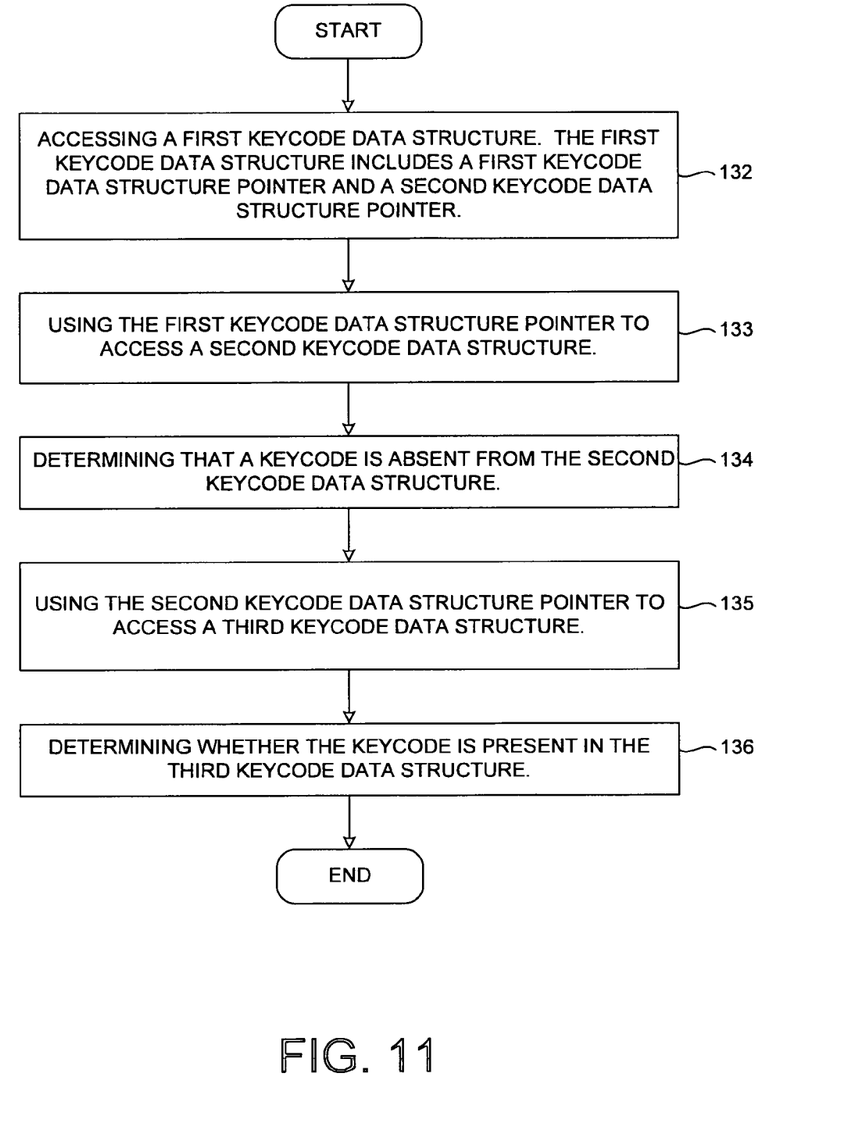
FIG. 11 illustrates a star linking method of finding a keycode in a codeset database.
Figure 12:
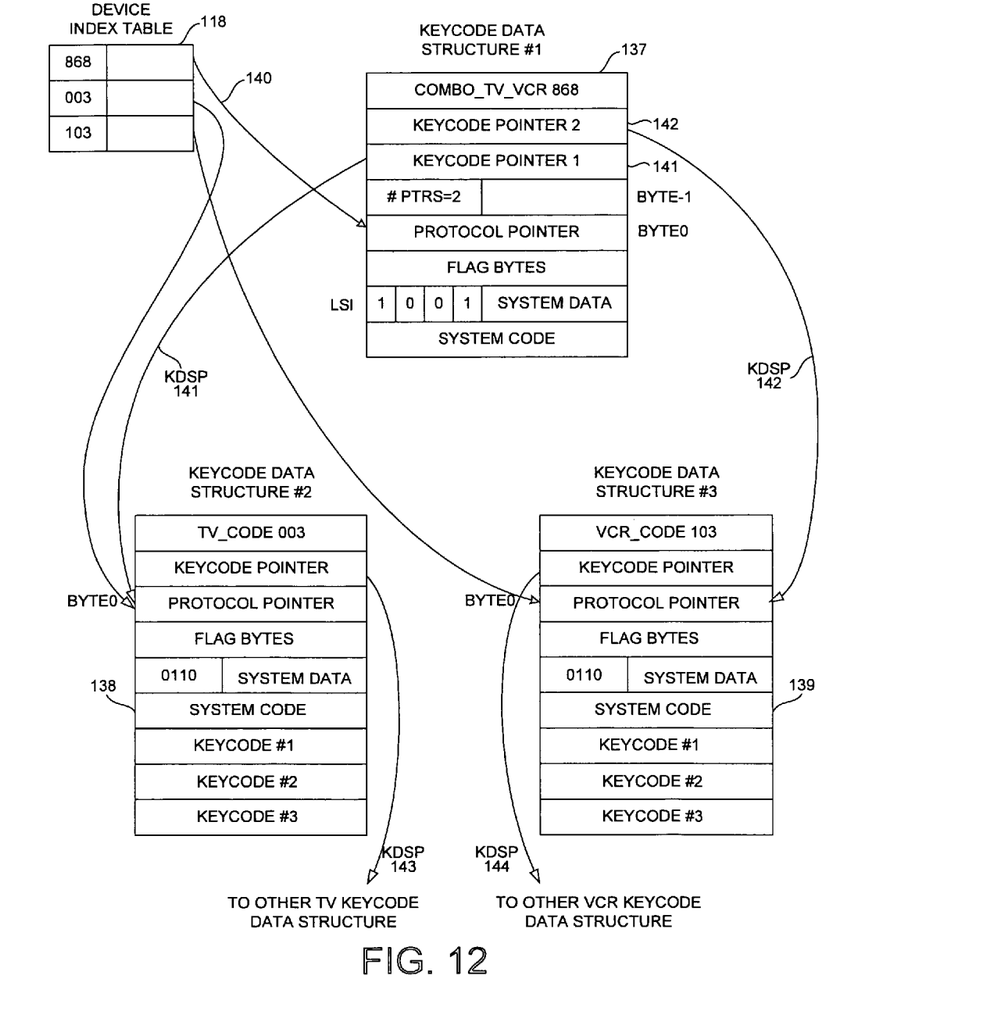
FIG. 12 illustrates the codeset database involved in the method of FIG. 11 for a combo device.

FIG. 11 is a flow chart of a method in accordance of one novel aspect. FIG. 12 is a diagram of several keycode data structures 137, 138, 139 as well as a device index table 118 that are involved in the method of FIG. 11. The method of FIG. 11 maintains and links the keycode data structures in a sequential star linking scheme that substantially reduces required memory space in certain situations. In addition, the star linking method stores codeset database for combo device efficiently.

Consider a UIR which controls a set of TV device types, a set of VCR device types, and a combo TV device with a built-in VCR. For each three digit device code, the device index table 118 includes an address of a corresponding keycode data structure. In the example of FIG. 12, the byte0 address of keycode data structure 137 is provided for device code 868, the byte0 address of keycode data structure 138 is provided for device code 003, and the byte0 address of keycode data structure 139 is provided for device code 103. If the UIR is programmed to control TV device type 003, then processor 115 of FIG. 4 accesses the byte0 address of keycode data structure 138. The processor then identifies the flag bit in keycode data structure 138 and determines whether a keycode for the pressed key is present using the offset value provided by key index table 117. If the keycode is not present, then processor 115 accesses the next TV keycode data structure pointed by KDSP 143 and searches for the keycode until it either finds the keycode or reaches the last TV keycode data structure with a NULL KDSP. Similarly, if the UIR is programmed to control VCR device type 103, then processor 115 accesses the byte0 address of keycode data structure 139 and repeats the same process as illustrated above.

If the UIR is programmed to control combo device type 868, then processor 115 of FIG. 4 follows the steps as illustrated in FIG. 11. For illustration purposes, consider a situation in which a "play" key is pressed. The keycode corresponding to the "play" key is stored in VCR keycode data structure 139. In first step 132, the processor accesses the byte0 address of keycode data structure 137, as indicated by link 140. In this example, keycode data structure 137 contains no actual keycodes but does contain multiple keycode data structure pointers (for instance, KDSP 143 and KDSP 144 are illustrated in FIG. 12). Linking scheme identifier (LSI) indicates whether a keycode data structure contains multiple KDSPs. If the LSI has a value of 0000, then the keycode data structure has a NULL KDSP and is not linked to any other keycode data structures. If the LSI has a value of 0110, then the keycode data structure has one KDSP. If the LSI has a value of 1001, then the keycode data structure has multiple KDSPs. If a keycode data structure contains multiple KDSPs, then the number of pointers (#PRTS) is stored in byte-1 of the keycode data structure.

In second step 133, processor 115 uses the first keycode data structure pointer KDSP 141 to access the TV keycode data structure 138. Processor 115 then determines (step 134) that the keycode for "play" key is not present in keycode data structure 138. Because there are multiple KDSPs available, processor 115 then uses (step 135) the second keycode data structure pointer KDSP 142 to access the VCR keycode data structure 139. In the last step 136, processor 115 determines that the keycode for the "play" key is present in keycode data structure 139. Microcontroller 113 of FIG. 4 then uses the keycode in combination with the system code and protocol information to generate an operational signal to control the "play" function of the combo device.

In the above example, keycode data structure 137 for a combo device is provided without the need to duplicate TV keycode data structure 138, or VCR keycode data structure 139. Because keycode data structure 137 does not contain any keycodes of a TV or VCR device, its size is substantially smaller than a keycode data structure which contains all the common keycodes of a TV device (for instance, keycode data structure 138) or VCR device (for instance, keycode data structure 139). Therefore, by linking the TV and VCR keycode data structures in a sequential star linking scheme, substantial memory space is saved.

Figure 13:
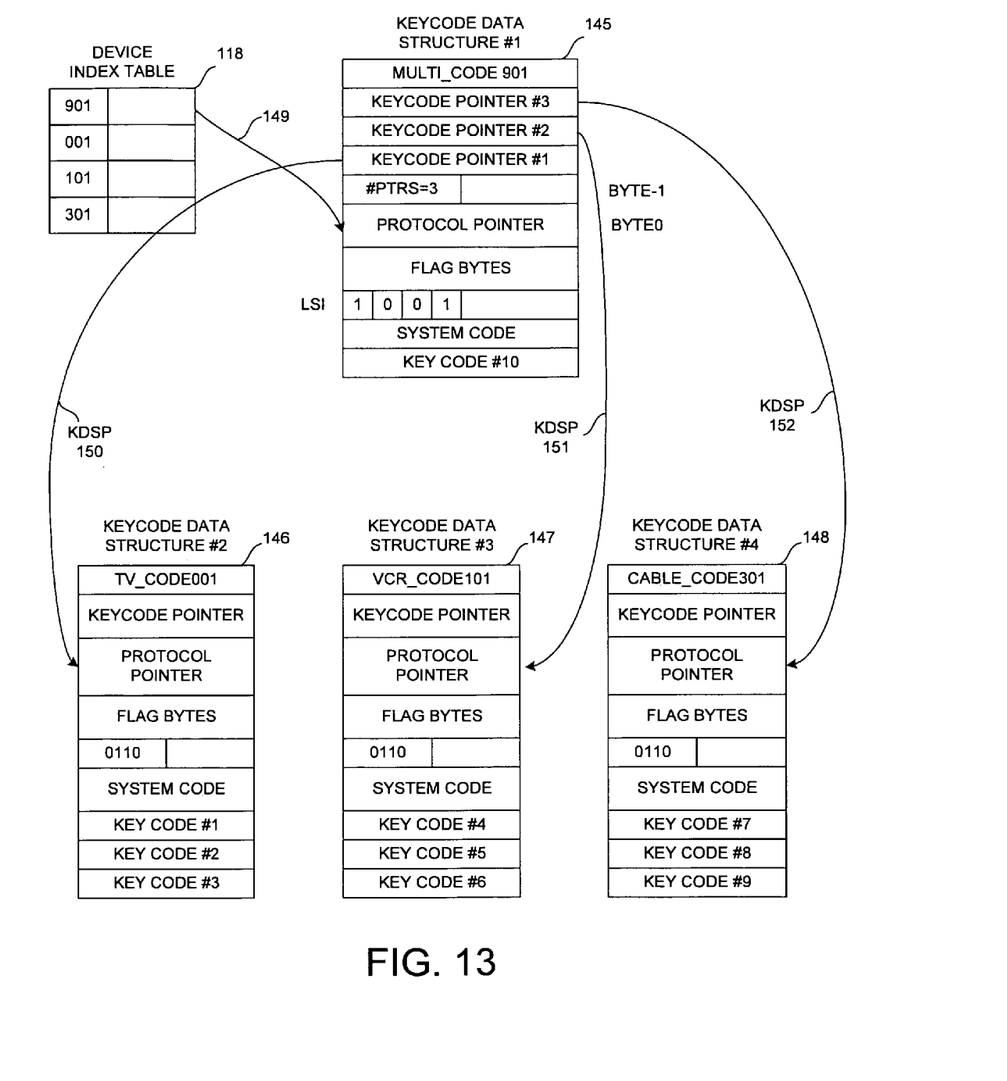
FIG. 13 illustrates the codeset database involved in the method of FIG. 11 for a multi-function device.

FIG. 13 illustrates one application of the sequential star linking method, which is to store a codeset database for a multi-function device efficiently. Suppose that a multi-function device has three different sets of functionality, i.e., TV, VCR, and cable set-top box. In the example of FIG. 13, keycode data structures 146, 147 and 148 are stored in the keycode database for each device type with device code TV001, VCR101 and Cable301. Using the star linking method, a new keycode data structure 145 is provided for the multi-function device without the need to duplicate any of the existing keycode data structures. Keycode data structure 145 contains multiple keycode data structure pointers (KDSPs), as indicated by the LSI (for instance, the value of 1001). The number of KDSPs (for instance, the value of 3) is stored in the byte-1 location. In this particular example, keycode data structure 145 contains three KDSPs. The three KDSPs link keycode data structures 145 to keycode data structures 146, 147, and 148 using a sequential star linking scheme.

If the UIR is programmed to control a multi-function device (for instance, with device code 901), then processor 115 of FIG. 4 follows the same method as illustrated in FIG. 11. Consider a situation in which a "menu" key for CABLE_CODE301 is pressed, processor 115 first accesses keycode data structure 145, as indicated by link 149. It then sequentially traverses the keycode data structures 146, 147 and 148 linked by KDSP 150, 151 and 152. Finally, processor 115 finds the keycode for the "menu" key in keycode data structure 148 and generates a corresponding operational signal.

Now suppose that the multi-function device requires a new keycode which is not present in any of the existing keycode data structures. Assume that the new key is associated with KEYCODE #10. In such a scenario, keycode data structure 145 is modified to include the additional KEYCODE #10, as illustrates in FIG. 13. In addition, the flagbytes are also modified to indicate that the new key is present in keycode data structure 145. Without any other modification or memory increase, the functionality of the new key can be easily supported.

Figure 14:
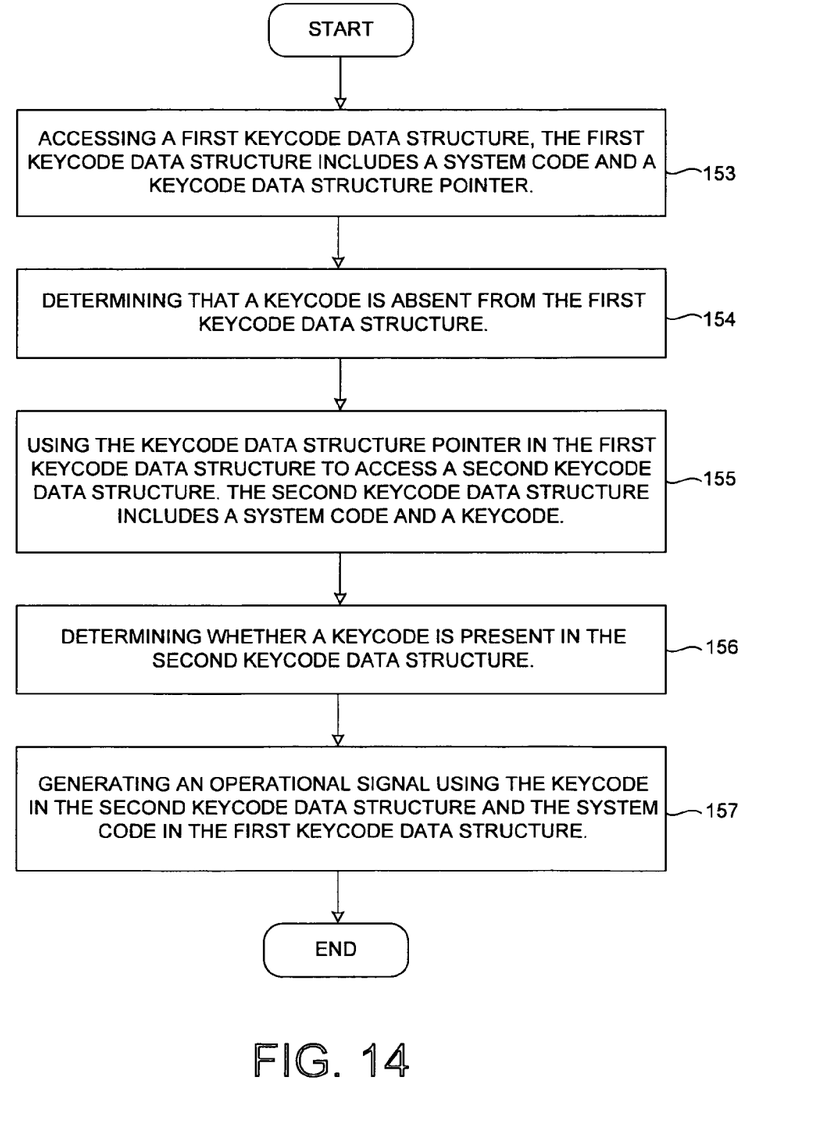
FIG. 14 illustrates a cluster linking method of finding a keycode in a codeset database.
Figure 15:
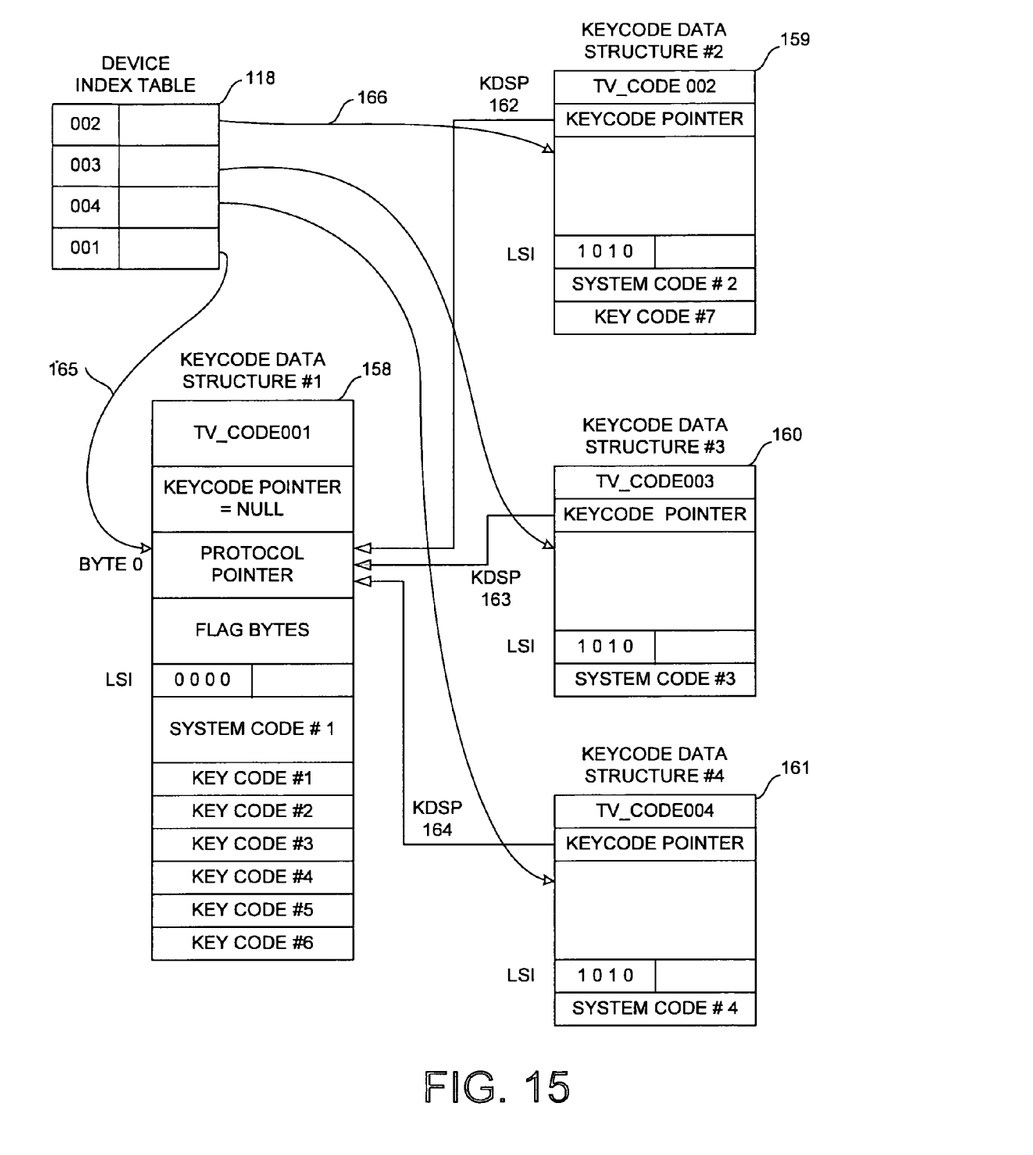
FIG. 15 illustrates the codeset database involved in the method of FIG. 14.

FIG. 14 is a flow chart of another method in accordance of one novel aspect. FIG. 15 is a diagram of several keycode data structures 158-161 as well as a device index table 118 that are involved in the method of FIG. 14. The method of FIG. 14 maintains and links the keycode data structures in a cluster linking scheme that substantially reduces required memory space in certain situations. The cluster linking scheme is used in a scenario where different electronic consumer device types share the same keycodes but have distinct system code information.

In the example of FIG. 15, keycode data structure 158 contains all common TV keycodes (for instance, KEYCODE #1-#6 are illustrated in FIG. 15) for TV device type 001. It also contains its own SYSTEMCODE #1. A system code is used in combination with a keycode to generate an operational signal. Suppose that aside from the device type TV_CODE001, there are three other TV devices (for instance, TV_CODE002, TV_CODE003 and TV_CODE004 are illustrated in FIG. 15) all share the same keycodes as TV_CODE001. However, these keycode data structures all have their own distinct system codes. Under such a scenario, keycode data structures 159, 160 and 161 do not contain KEYCODES #1-#6. Instead, each keycode data structure contains its own system code, a keycode data structure pointer that points to keycode data structure 158 (for instance, KDSP 162, 163 and 164, are illustrated in FIG. 15), and a special nibble in the system data byte with a value of 1010.

Suppose a UIR is programmed to control TV device type 001. When a key is pressed on the UIR, processor 115 of FIG. 4 first accesses the byte0 address of keycode data structure 158, as indicated by link 165. The processor then identifies the flag bit in keycode data structure 158 and determines whether the pressed key is present using the offset value provided by key index table 117. If the keycode is found (for instance, KEYCODE #2), then KEYCODE #2 in combination with SYSTEMCODE #1 are used to generate an operational signal. Now suppose the UIR is programmed to control TV device type 002. When a key is pressed on the UIR, processor 115 follows the steps illustrated in FIG. 14. Processor 115 of FIG. 4 first accesses (step 153) keycode data structure 159, as indicated by link 166. Processor 115 then determines (step 154) that the keycode for the pressed key is not present in keycode data structure 159. Processor 115 then uses (step 155) keycode data structure pointer (KDSP) 162 to access keycode data structure 158. In the forth step 156, processor 115 determines that the keycode for the pressed key (for instance, KEYCODE #2) is present in keycode data structure 158. In the last step 157, KEYCODE #2 in combination with SYSTEMCODE #2 are used to generate an operational signal.

In the above example, keycode data structures are provided for different TV device types with the same keycodes but distinct system code. Among those keycode data structures, only one of them contains the actual keycodes. The other keycode data structures contain only the system code and a keycode data structure pointer that points to the same keycode data structure that contains the actual keycodes. By linking all the keycode data structures into the same cluster, substantial memory space is saved. The processor simply relies on the LSI value (for instance, the value of 1010) to determine which system code to use when it generates an operational signal.

For additional information on codesets, keycodes, modulation information, the generation of operational signals, universal remote control devices, their uses and related topics, see: U.S. patent application Ser. No. 10/737,129, filed Dec. 16, 2003, by Daniel SauFu Mui, entitled "Relaying Key Code Signals through a Remote Control Device"; U.S. patent application Ser. No. 10/777,023, filed Feb. 10, 2004, by Lee et al., entitled "Interactive Web-Based Codeset Selection And Development Tool"; U.S. patent application Ser. No. 10/928, 808, filed Aug. 27, 2004, by Provis et al., entitled "An 8-Bit Register-Based Virtual Machine"(the subject matter of these documents is incorporated herein by reference).

Although certain specific exemplary embodiments are described above in order to illustrate the invention, the invention is not limited to the specific embodiments. In the example above of FIG. 7 each of the pointers 123 is not followed by a device type identifier. In one example, however, each of the pointers 123 is followed by a device type identifier associated with the pointer. Accordingly, various modifications, adaptations, and combinations of various features of the described embodiments can be practiced without departing from the scope of the invention as set forth in the claims.

What is claimed is:

1. A controlling device having a memory in which is stored a first device keycode data structure, the first device keycode data structure stored in the memory of the controlling device comprising:
   a first keycode associated with a first key of the controlling device;
   a second device keycode data structure pointer pointing to a second device keycode data structure; and
   a third device keycode data structure pointer pointing to a third device keycode data structure;
   wherein the second device keycode data structure comprises a second keycode associated with a second key of the controlling device and the third device keycode data structure comprises a third keycode associated with a third key of the controlling device and wherein each of the first, second, and third keycodes comprise data used to generate an operational signal to be transmitted by the controlling device.

2. The controlling device of claim 1, wherein the second device keycode data structure pointer is a relative offset.

3. The controlling device of claim 1, wherein the second device keycode data structure pointer is an absolute address.

4. The controlling device of claim 1, wherein the data used to generate an operational signal to be transmitted by the controlling device comprises a sequence of indices, wherein the indices identify mark times and space times characterizing digital ones and zeros in an operational signal.

5. The controlling device of claim 1, wherein the first keycode data structure stored in the memory of the controlling device further comprises a flag, the flag being indicative of whether a keycode associated with a particular key on the controlling device is present in the first keycode data structure.

6. The controlling device of claim 1, wherein the first keycode data structure stored in the memory of the controlling device further comprises an protocol pointer that points to a protocol table, wherein the protocol table comprises timing and modulation information for an operational signal.

7. A method performed in response to an activation of a key of a controlling device; comprising:
   (a) accessing a first device keycode data structure stored in the memory of the controlling device, wherein the first device keycode data structure includes a second device keycode data structure pointer pointing to a second device keycode data structure and a third device keycode data structure pointer pointing to a third device keycode data structure;
   (b) using the second device keycode data structure pointer to access the second device keycode data structure;
   (c) determining that a keycode corresponding to the key is absent from the second device keycode data structure;
   (d) using the third device keycode data structure pointer to access the third device keycode data structure; and
   (e) using a keycode corresponding to the key present in the third device keycode data structure to generate an operational signal to be transmitted by the controlling device.

8. The method of claim 7, wherein the second device keycode data structure pointer is a relative offset to the second device keycode data structure.

9. The method of claim 7, wherein the second device keycode data structure pointer is an absolute address of the second device keycode data structure.

10. The method of claim 7, wherein the keycode corresponding to the key comprises a sequence of indices, wherein the indices identify mark times and space times characterizing digital ones and zeros in an operational signal.

11. A controlling device having a memory in which is stored a first device keycode data structure, the first device keycode data structure stored in the memory of the controlling device, comprising:

a system code;

a second device keycode data structure pointer, wherein the second device keycode data structure pointer points to a second device keycode data structure, wherein the second device keycode data structure comprises a first keycode associated with a first key of the controlling device and comprising first data; and a third device keycode data structure pointer, wherein the third device keycode data structure pointer points to a third device keycode data structure, wherein the third device keycode data structure comprises a second keycode associated with a second key of the controlling device and comprising second data;

wherein the system code of the first device keycode data structure is used in connection with at least one of the first data of the first keycode of the second device keycode data structure and the second data of the second keycode of the third device keycode data structure to generate an operational signal to be transmitted by the controlling device.

12. The controlling device of claim 11, wherein the memory stores a fourth device keycode data structure, wherein the fourth device keycode data structure comprises a first device keycode data structure pointer that points to the first device keycode data structure.

* * * * *